United States Patent [19]
Charron

[11] 3,943,819
[45] Mar. 16, 1976

[54] TENSILE MEMBER WITH TENSION INDICATING MEANS

[76] Inventor: Charles S. Charron, 1607 Watersedge Road, Clarkson, Ontario, Canada

[22] Filed: Aug. 22, 1974

[21] Appl. No.: 499,550

[52] U.S. Cl. ................................. 85/62; 73/88 F
[51] Int. Cl.² ................................. G01D 21/00
[58] Field of Search .......... 85/1 T, 62; 73/88 F; 116/114 R

[56] References Cited
UNITED STATES PATENTS

| | | | |
|---|---|---|---|
| 2,061,261 | 11/1936 | Walter | 85/1 T |
| 3,248,923 | 5/1966 | Blakeley | 85/62 |
| 3,602,186 | 8/1971 | Popenoe | 85/62 |
| 3,799,108 | 3/1974 | Mosow | 85/62 |
| 3,823,639 | 7/1974 | Liber | 85/62 |

*Primary Examiner*—Marion Parsons, Jr.

[57] ABSTRACT

A tensile member such as a bolt fastener comprises an elongated body formed with an open-ended longitudinal bore extending through an intermediate region of the body. A tubular sleeve and a test rod extend coaxially into the bore and are secured therein at longitudinally spaced positions within the intermediate region. The tubular sleeve and the test rod each have a free end adjacent to the open end of the bore. Tensile stress within the intermediate region of the body of the tensile member is measured by measuring relative longitudinal displacement between the end faces of the sleeve and test rod at their free ends.

8 Claims, 3 Drawing Figures

TENSILE MEMBER WITH TENSION INDICATING MEANS

This invention relates to a tensile member which is adapted to be used in association with means for indicating the tension to which the member is subjected. Such indicating means may be used to indicate the stress placed on a bolt or other tensionable fastener so that it may be stressed initially to a predetermined level, or may be used to indicate changes in stress over a period of time after installation of the fastener in a structure.

The invention relates more particularly to a tensile member of the type comprising an elongated body having an intermediate body portion of uniform cross section defining a measuring region, the body being formed with an open-ended longitudinal bore extending through the measuring region, and a test rod extending through the measuring region, and a test rod extending along the bore and secured to the body at one end within the intermediate body portion of the tensile member. When the tensile member is stressed, the free end of the test rod, which is not stressed, is displaced longitudinally relative to the end face of the tensile member by an amount determined by the applied stress. The displacement may be measured by means of any suitable gauge, which may or may not be permanently attached to the tensile member. A serious disadvantage of known tensile members with tension indicating means of this type is that errors due to stretch in an end region of the tensile member inevitably arise. For example, in the case of a tension indicating bolt of this kind, stress applied to the bolt causes a strain on the threaded bolt portion which affects the measured displacement. More generally, in any such tensile member in which stress is measured by detecting the longitudinal relative displacement between a stressed component and an unstressed component, the measured displacement is an indeterminate function of the true tensile stress within the measuring region of the tensile member.

According to the present invention this disadvantage is overcome by providing a tubular sleeve extending along the bore, and a test rod extending along the bore and through the sleeve, the sleeve and test rod being secured to the body of the tensile member at respective longitudinally spaced positions within the measuring region of the body, the sleeve and test rod each having a free end adjacent the open end of the bore, and being the said end faces providing a reference for measurement of elongation of the intermediate body portion whereby changes of tensile load on the tensile member can be determined.

Embodiments of the invention will now be described by way of example with reference to the accompanying drawings, in which.

Figure 1:
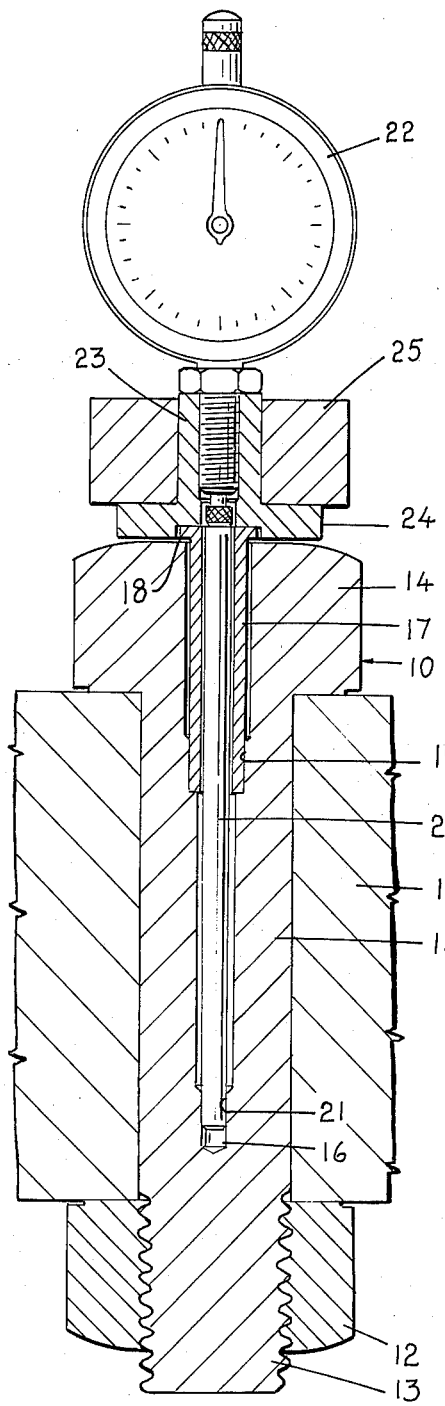
FIG. 1 is a longitudinal sectional view of a tension bolt with tension indicating means mounted at the bolt head.

FIG. 1 shows a tension bolt 10 extending through a structural assembly 11 and placed in tension by a nut 12 on the threaded end 13 of the bolt. The bolt has a head 14 which bears on one side of the structural assembly, and an elongated shank portion 15 of uniform cross section between the head 14 and the threaded end 13; the shank portion 15 defines a measuring region. A longitudinal bore 16 extends along the axis of the bolt, the bore having an open end at the bolt head. A tubular sleeve 17, having a flange 18 defining an end face, extends along the bore 16 and is secured to the body at a stepped region 19 of the bore 16, the stepped region 19 being of such a diameter as to provide a press fit for the end of the sleeve. A test rod 20 extends along the bore 16 and through the sleeve 17, one end of the test rod being secured to the body at a second stepped region 21, the latter being of such a diameter as to provide a press fit for the end of the test rod. The sleeve and the test rod could, of course, be secured in alternative ways, as for example by welding, within the bore.

It is important to note that the sleeve 17 and the test rod 20 each have a free end adjacent to the open end of the bore 16, and so they are not placed under tension when the bolt 10 is stressed. In consequence the end faces at the free ends of the sleeve and the test rod provide a reference for measurement of the bolt tension within the measuring region of the bolt, more particularly within the region extending between the longitudinally spaced stepped regions 19 and 21, relative longitudinal displacement between said end faces providing a measure of the tensile load on the bolt within the measuring region. In cases where the assembly may be subjected to large temperature changes, the sleeve and the test rod should be of the same metal as the bolt, or at least of a metal having a similar coefficient of thermal expansion.

In order to measure the relative longitudinal displacement between the end faces of the sleeve and the test rod, in the embodiment shown in FIG. 1, a conventional dial gauge 22 is used. The dial gauge is mounted in a tubular adaptor 23 having a flange 24, the flange 24 having a circular recess which accomodates the end flange 18 of the sleeve. The adaptor is clamped to the head of the bolt by means of an annular permanent magnet 25 which fits over the tubular shank of the adaptor 23 and bears of the flange 24. In this embodiment it is envisaged, of course, that the bolt 10 and adaptor 23 are of steel.

Figure 2:
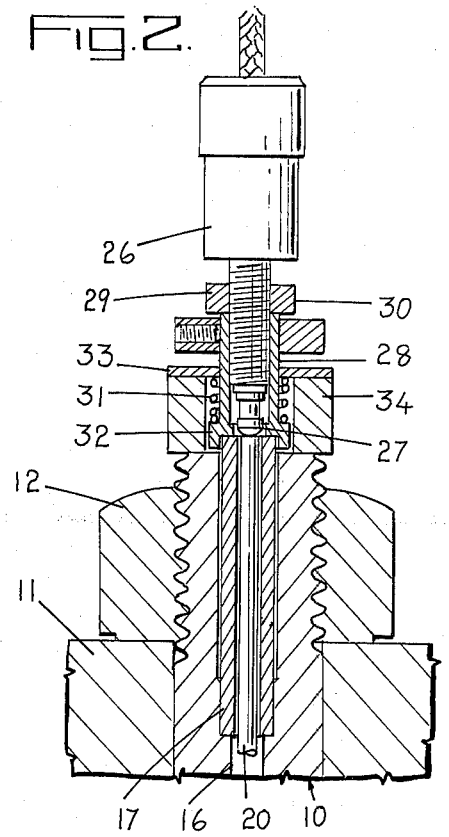
FIG. 2 is a fragmentary sectional view of a second tension bolt with tension indicating means mounted at the threaded end of the bolt and secured thereto by magnetic means.

FIG. 2 shows a modified arrangement in which the bolt 10 extends through a structural assembly 11 and is placed in tension by a nut 12 as before, but in which the bore 16 extends through the threaded region of the bolt and has an open end remote from the bolt head. A tubular sleeve 17 and a test rod 20 extend coaxially along the bore, and are secured to the bolt body at their lower ends by longitudinally spaced stepped regions of the bore whose diameters are such as to provide press fits for the sleeve and the test rod. As in the preceding embodiment, tensile load on the bolt within the measuring region between the secured ends of the sleeve and the test rod is determined by measuring the relative longitudinal displacement between the end faces at the free upper ends of the sleeve and test rod. As illustrated in FIG. 2, this relative displacement is measured by means of a transducer gauge 26 having a probe 27 which bears on the end face of the test rod 20, the transducer gauge being mounted in a tubular adaptor 28 one end of which bears on the end face of the sleeve 17. The transducer gauge is so mounted by means of a lock nut 29 which bears on a stop 30 fixed to the tubular adaptor. A compression spring 31 extends between a lower flange 32 of the adaptor and an annular retainer plate 33 to which a permanent magnet 34 is fixed.

Figure 3:
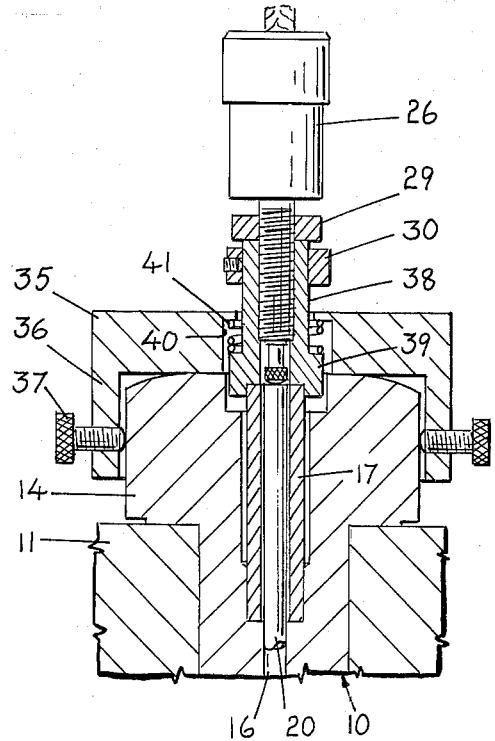
FIG. 3 is a fragmentary sectional view of a third tension bolt with tension indicating means mounted on the bolt head by mechanical clamping means.

FIG. 3 shows another modification. In this figure the reference numerals 10, 11, 14, 16, 17, 20 and 26 respectively denote the tension bolt, structural assembly, bolt head, axial bore, tubular sleeve, test rod and transducer gauge. In this embodiment the transducer gauge is clamped to the bolt head by means of a cap 35 having a cylindrical flange 36 through which clamping screws 37 extend to engage the bolt head. A tubular adaptor 38 having a radial flange 39 is located in a recess 40 of the cap by means of a compression spring 41 which bears on the flange 39. The upper part of the tubular adaptor 38 extends from the cap and the transducer gauge 26 is secured to this upper part by a lock nut 29 which engages a stop 30. Since the lower end of the tubular adaptor 38 bears on the end face of the sleeve 17, relative longitudinal displacements between the end faces of the sleeve and the test rod are measured by movements of the transducer gauge probe 27 which bears on the end of the test rod.

In each of these embodiments, in order to prevent rusting and corrosion, and to prevent ingress of foreign substances into the bore 16, the clearances within the bore may be filled with a resilient, non-hardening sealing compound such as a suitable RIV silicone.

Further, the open end of the bore may be adapted to receive a removable closure cap to protect the internal parts and surfaces at times when tensile load measurements are not required.

The embodiments of the invention in which an exclusive property or privilege is claimed are defined as follows:

1. A tensile member comprising an elongated body having an intermediate body portion of uniform cross section defining a measuring region, the body being formed with an open-ended longitudinal bore extending through the measuring region, a tubular sleeve extending along the bore, a test rod extending along the bore and through sleeve, said sleeve and test rod being secured to the body at respective longitudinally spaced positions within said measuring region, said sleeve and test rod each having a free end adjacent the open end of the bore and providing an end face, said end faces providing a reference for measurement of elongation of the intermediate body portion whereby changes of tensile load on the tensile member can be determined.

2. A tensile member according to claim 1, wherein the bore is open at one end only.

3. A tensile member according to claim 1, wherein the body, sleeve and test rod are of the same material or materials having substantially the same coefficients of thermal expansion.

4. In combination with a tensile member as claimed in claim 1, a linear gauge having bearing faces engageable with the end faces of the sleeve and the test rod, respectively, for reading out changes in tensile load according to relative longitudinal displacements between the end faces.

5. A bolt type fastener comprising an elongated body having a head at one end, a threaded portion at the other end, and an intermediate shank portion of uniform cross section defining a measuring region, the body being formed with a longitudinal bore open at one end, a tubular sleeve extending along the bore from said open end to a first position within said measuring region, a test rod extending along the bore concentrically with the sleeve from said open end to a second position within said measuring region which is farther than said first position from the open end of the bore, said sleeve and test rod being secured to the body at said first and second positions respectively and each providing an end face adjacent to said open end, which end faces provide a reference for measurement of elongation of the measuring zone in accordance with the relative longitudinal displacement between the end faces whereby changes of tensile load on the fastener can be determined.

6. A bolt type fastener according to claim 5, wherein the body, the sleeve and the test rod are of the same material or materials having substantially the same coefficients of thermal expansion.

7. A bolt type fastener according to claim 5, wherein the bore is open at one end only, and wherein the body is adapted at said one end to receive a closure cap, therein being provided a closure cap for closing the open end of the bore.

8. In combination with a bolt type fastener as claimed in claim 5, a linear gauge having bearing faces engageable with the end faces of the sleeve and the test rod, respectively, for reading out changes in tensile load according to relative longitudinal displacements between the end faces.

* * * * *